(12) United States Patent
Ohno (10) Patent No.: US 7,933,578 B2
(45) Date of Patent: Apr. 26, 2011

(54) COMMUNICATION CONTROL SYSTEM, MOTOR VEHICLE, COMMUNICATION CONTROL PROGRAM, AND SYSTEM ESTABLISHING THE COMMUNICATION CONTROL SYSTEM

(75) Inventor: Tsuneo Ohno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 890 days.

(21) Appl. No.: 11/878,211

(22) Filed: Jul. 23, 2007

(65) Prior Publication Data

US 2008/0174447 A1 Jul. 24, 2008

(30) Foreign Application Priority Data

Aug. 10, 2006 (JP) ................................. 2006-218260

(51) Int. Cl.
*H05K 11/02* (2006.01)
(52) U.S. Cl. ...................... 455/345; 455/238.1; 455/297
(58) Field of Classification Search ............... 455/556.1, 455/569.2, 575.9, 230, 231, 238.1, 297, 345
See application file for complete search history.

(56) References Cited

U.S. PATENT DOCUMENTS

| 6,804,514 | B2 * | 10/2004 | Wiedeman et al. ........... 455/427 |
| 6,975,836 | B2 | 12/2005 | Tashiro et al. | |
| 2005/0043020 | A1 | 2/2005 | Lipsanen et al. | |

FOREIGN PATENT DOCUMENTS

| DE | 102004032916 A1 | 2/2006 |
| DE | 102006004024 A1 | 8/2007 |
| JP | 2002-335556 A | 11/2002 |
| JP | 2003-204307 A | 7/2003 |
| JP | 3498887 B2 | 12/2003 |
| JP | 2004-328239 A | 11/2004 |

OTHER PUBLICATIONS

Osborne, Adam, Einführung in die Microcomputer-Technik. Grunlagenbuch der Microcomputr-Technik völlig überarb. Neeuauflage, 6. Aufl., Munich, te-wi Verlag GmbH 1982. ISBN 3-921803-12-08; p. 5-76 to 5-94.
Thies, Klaus-Dieter: Multitasking. Grundlagen, Betriebssystem-Kern-Funktionen für Intel-Prozessoren, Parallele Programmierung, Realzeit-Systeme, Munich, Vienna. Carl Hanser-Verlag, 1994, ISBN 3-446-17506-7; p. 1 to 5,35,36,50 to 58, 107 to 136, and 265 to 278.

\* cited by examiner

*Primary Examiner* — Edward Urban
*Assistant Examiner* — Christian A Hannon
(74) *Attorney, Agent, or Firm* — Arent Fox LLP (57) ABSTRACT

A system capable of appropriately controlling an operation of an information processing device mounted on a mobile apparatus for effective use of information processing resources of the information processing device is provided. According to the device control system (10), information processing by a first information processing device (11) is restricted when the first information processing device (11) is set to receive data through a high-speed broadcast channel. Thus, the information processing resources of the first information processing device (11) are primarily allocated to reception of designated data through the high-speed broadcast channel. Further, allocation of the information processing resources to information processing other than the reception of the designated data, such as information processing requested from a second information processing device (12), is restricted. This prevents shortage of the information processing resources due to the execution of information processing other than the reception of the designated data, which would otherwise impair the reception of the designated data and the execution of the other information processing.

13 Claims, 4 Drawing Sheets

COMMUNICATION CONTROL SYSTEM, MOTOR VEHICLE, COMMUNICATION CONTROL PROGRAM, AND SYSTEM ESTABLISHING THE COMMUNICATION CONTROL SYSTEM

BACKGROUND OF THE INVENTION

1. Field of the Invention

The present invention relates to a system (device control system) to control an operation of a device mounted on a mobile apparatus, a motor vehicle as the mobile apparatus provided with the device control system, a program to provide a computer mounted in the mobile apparatus with the function of the device control system, and a system establishing the device control system.

2. Description of the Related Art

A motor vehicle is provided with various first information processing devices, such as a navigation device, a traveling control device and the like, the functions of which are updated as software stored in a memory of each device is updated, to ensure improvement in user-friendliness of the motor vehicle as well as the first information processing devices. The software is updated as the data for updating of the software is distributed to the first information processing device (see Japanese Patent No. 3498887).

When information processing resources of the first information processing device are largely allocated to reception of data, however, if the device tries to carry out information processing in parallel with the data reception, the data reception or execution of the information processing may be impaired.

SUMMARY OF THE INVENTION

In view of the foregoing, an object of the present invention is to provide a system (device control system) that can appropriately control an operation of an information processing device mounted on a mobile apparatus from the standpoint of effective use of information processing resources of the information processing device, a motor vehicle as a mobile apparatus provided with the device control system, a program providing the device control function to a computer mounted in the mobile apparatus, and a system establishing the device control system.

According to a first aspect of the present invention, there is provided a device control system for controlling an operation of an information processing device mounted on a mobile apparatus and having a function to receive data broadcast at low speed or high speed from an information center through a low-speed broadcast channel or a high-speed broadcast channel, which includes: a first processing section to recognize whether a first information processing device is set to receive data through the high-speed broadcast channel; and a second processing section to restrict execution of information processing by the first information processing device on the condition that it is recognized by the first processing section that the first information processing device is set to receive data through the high-speed broadcast channel.

According to the device control system of the first aspect of the invention, information processing by the first information processing device is restricted when the first information processing device is set to receive data through the high-speed broadcast channel. This allows the information processing resources of the first information processing device to be primarily allocated to reception of designated data through the high-speed broadcast channel. Further, allocation of the information processing resources to information processing other than the reception of the designated data, such as information processing instructed by an operator or information processing requested from a second information processing device, is restricted. This surely prevents shortage of the information processing resources due to execution of the information processing other than the reception of the designated data, which would otherwise impair the reception of the designated data and even the execution of the other information processing. As described above, the operation of the first information processing device mounted on the mobile apparatus can be controlled appropriately from the standpoint of effective use of information processing resources of the first information processing device.

As used herein, that the execution of information processing is restricted not only refers to the case where execution of information processing is partially prohibited while execution of the other information processing is permitted exceptionally, but also refers to the case where information processing is entirely prohibited.

The device control system according to a second aspect of the invention is characterized in that, in the device control system of the first aspect, the second processing section restricts reception of data other than designated data by the first information processing device through the low-speed broadcast channel or the high-speed broadcast channel, based on recognition as to whether the data is the designated data or not according to a data identifier assigned to the data.

According to the device control system of the second aspect of the invention, it is possible to surely prevent the shortage of the information processing resources of the first information processing device due to reception of data other than the designated data, which would otherwise impair the reception of the relevant data as well as the reception of the designated data. It may be configured to exceptionally permit reception of part of the data other than the designated data through the high-speed or low-speed broadcast channel, while prohibiting reception of the remaining part of the other data.

The device control system according to a third aspect of the invention is characterized in that, in the device control system of the first aspect, the second processing section restricts an execution instruction for information processing to the first information processing device by an operator.

According to the device control system of the third aspect of the invention, it is possible to surely prevent the undesirable situation where the first information processing device receiving the designated data through the high-speed broadcast channel faces shortage of the information processing resources of the first information processing device due to execution of the information processing instructed by the operator, which would otherwise impair the reception of the designated data as well as the execution of the relevant information processing.

The device control system according to a fourth aspect of the invention is characterized in that, in the device control system of the third aspect, the second processing section outputs a restriction notification indicating that the execution instruction for the information processing to the first information processing device by the operator is restricted.

According to the device control system of the fourth aspect of the invention, it is possible to surely prevent the undesirable situation where the instruction for the information processing, which is actually restricted, is permitted to the operator, thereby causing misunderstanding or confusion of the operator.

The device control system according to a fifth aspect of the invention is characterized in that, in the device control system of the first aspect, the second processing section restricts an execution request for information processing to the first information processing device from a second information processing device mounted on the mobile apparatus.

According to the device control system of the fifth aspect of the invention, it is possible to surely prevent the undesirable situation where the first information processing device receiving the designated data through the high-speed broadcast channel faces shortage of the information processing resources of the first information processing device due to execution of the information processing requested from the second information processing device, which would otherwise impair the reception of the designated data as well as the execution of the relevant information processing.

The device control system according to a sixth aspect of the invention is characterized in that, in the device control system of the fifth aspect, the second processing section outputs to the second information processing device a restriction notification indicating that information processing involving the execution request for the information processing to the first information processing device from the second information processing device is restricted.

According to the device control system of the sixth aspect of the invention, it is possible to surely prevent the undesirable situation where the execution request for the information processing, which is actually restricted, is permitted to the second information processing device, thereby impairing the other information processing by the second information processing device. It is also possible to prevent the situation, e.g., where despite a request from the second information processing device for execution of information processing to the first information processing device, the requested information processing is not executed for a long time, thus leading to erroneous detection of occurrence of an error.

The device control system according to a seventh aspect of the invention is characterized in that, in the device control system of the first aspect, the second processing section removes the restriction on execution of the information processing by the first information processing device on the condition that it is recognized by the first processing section that reception of the designated data by the first information processing device has been completed.

According to the device control system of the seventh aspect of the invention, the information processing resources of the first information processing device that have been allocated to reception of the designated data through the high-speed broadcast channel are allocated to other information processing after completion of the reception of the designated data. This ensures effective use of the information processing resources of the first information processing device.

The device control system according to an eighth aspect of the invention is characterized in that, in the device control system of the seventh aspect, the second processing section outputs a removal notification indicating that the restriction on execution of the information processing by the first information processing device has been removed.

According to the device control system of the eighth aspect of the invention, it is possible to allow the user or the second information processing device to recognize that the reception of the designated data by the first information processing device through the high-speed broadcast channel has been completed and that the information processing restricted theretofore is now possible.

The device control system according to a ninth aspect of the invention is characterized in that, in the device control system of the second aspect, the first processing section causes the first information processing device to recognize the designated data and receive the recognized designated data through the high-speed broadcast channel.

According to the device control system of the ninth aspect of the invention, data other than the designated data that the first processing section causes the first information processing device to recognize is prevented from being received by the first information processing device through the high-speed broadcast channel.

The device control system according to a tenth aspect of the invention is characterized in that, in the device control system of the second aspect, the first processing section causes the first information processing device to recognize data other than the designated data and receive the recognized data through the low-speed broadcast channel.

According to the device control system of the tenth aspect of the invention, it is possible to cause the first information processing device to receive data other than the designated data that the first processing section causes the first information processing device to recognize, through the low-speed broadcast channel. This avoids total prohibition of reception of important data other than the designated data by the first information processing device.

The device control system according to an eleventh aspect of the invention is characterized in that, in the device control system of the second aspect, the first processing section causes the first information processing device to start reception of the designated data through the high-speed broadcast channel, on the condition of recognition of a prescribed operation by an operator in the first information processing device.

According to the device control system of the eleventh aspect of the invention, the reception of the designated data is started on the condition that there is a prescribed operation in the first information processing device, which may be an input of special information (key) to the first information processing device that only the operator knows. This prevents the designated data from being received by the first information processing device in response to an operation of the first information processing device by a user of the mobile apparatus who does not know the prescribed operation, and thus, prevents improper restriction of information processing by the first information processing device.

The device control system according to a twelfth aspect of the invention is characterized in that, in the device control system of the eleventh aspect, the first processing section causes the first information processing device to start reception of the designated data through the high-speed broadcast channel, on the condition of recognition of the prescribed operation in response to information broadcast from the information center and received by the first information processing device.

According to the device control system of the twelfth aspect of the invention, it is possible to prevent the designated data from being received by the first information processing device in response to an operation of the first information processing device by a user of the mobile apparatus who does not know the prescribed operation in accordance with the information broadcast from the information center, and thus, to prevent improper restriction of information processing by the first information processing device.

The device control system according to a thirteenth aspect of the invention is characterized in that, in the device control system of the eleventh aspect, the first processing section causes the first information processing device to attain a state enabling the prescribed operation by the operator, on the condition that prescribed information broadcast from the information center has been received by the first information processing device.

The device control system according to a fourteenth aspect of the invention is characterized in that, in the device control system of the twelfth aspect, the first processing section causes the first information processing device to attain a state enabling the prescribed operation by the operator, on the condition that prescribed information broadcast from the information center has been received by the first information processing device.

According to the device control systems of the thirteenth and fourteenth aspects of the invention, it is possible to prevent the designated data from being received by the first information processing device at an unexpected timing, and to prevent improper restriction of the information processing by the first information processing device.

According to a fifteenth aspect of the present invention, there is provided a motor vehicle having mounted thereon a device control system for controlling an operation of an information processing device having a function to receive data broadcast at low speed or high speed from an information center through a low-speed broadcast channel or a high-speed broadcast channel, wherein the device control system includes: a first processing section to recognize whether a first information processing device is set to receive data through the high-speed broadcast channel; and a second processing section to restrict execution of information processing by the first information processing device on the condition that it is recognized by the first processing section that the first information processing device is set to receive data through the high-speed broadcast channel.

According to the motor vehicle of the fifteenth aspect of the invention, the operation of the first information processing device mounted on the motor vehicle can be controlled appropriately from the standpoint of effective use of information processing resources of the first information processing device.

According to a sixteenth aspect of the present invention, there is provided a device control program for causing a computer mounted in a mobile apparatus to function as a system controlling an operation of an information processing device mounted on the mobile apparatus and having a function to receive data broadcast at low speed or high speed from an information center through a low-speed broadcast channel or a high-speed broadcast channel, wherein the device control program causes the computer to function as the system including: a first processing section to recognize whether a first information processing device is set to receive data through the high-speed broadcast channel; and a second processing section to restrict execution of information processing by the first information processing device on the condition that it is recognized by the first processing section that the first information processing device is set to receive data through the high-speed broadcast channel.

According to the device control program of the sixteenth aspect of the invention, it is possible to cause the computer mounted in the mobile apparatus to function as the system that appropriately controls the operation of the first information processing device mounted on the mobile apparatus from the standpoint of effective use of information processing resources of the first information processing device.

According to a seventeenth aspect of the present invention, there is provided an establishment system for establishing a computer mounted in a mobile apparatus as a device control system by distributing or broadcasting a device control program and causing the computer to store the device control program, wherein the establishment system establishes the device control system that controls an operation of an information processing device mounted on the mobile apparatus and having a function to receive data broadcast at low speed or high speed from an information center through a low-speed broadcast channel or a high-speed broadcast channel, and that includes a first processing section to recognize whether a first information processing device is set to receive data through the high-speed broadcast channel, and also includes a second processing section to restrict execution of information processing by the first information processing device on the condition that it is recognized by the first processing section that the first information processing device is set to receive data through the high-speed broadcast channel.

According to the establishment system of the seventeenth aspect of the invention, the system capable of appropriately controlling the operation of the first information processing device mounted on the mobile apparatus from the standpoint of effective use of information processing resources of the first information processing device can be established at an arbitrary timing.

DESCRIPTION OF THE PREFERRED EMBODIMENTS

Embodiments of the device control system and others of the present invention will now be described with reference to the drawings.

Firstly, the configurations of the device control system and others according to an embodiment of the present invention will be described with reference to FIG. 1.

Figure 1:
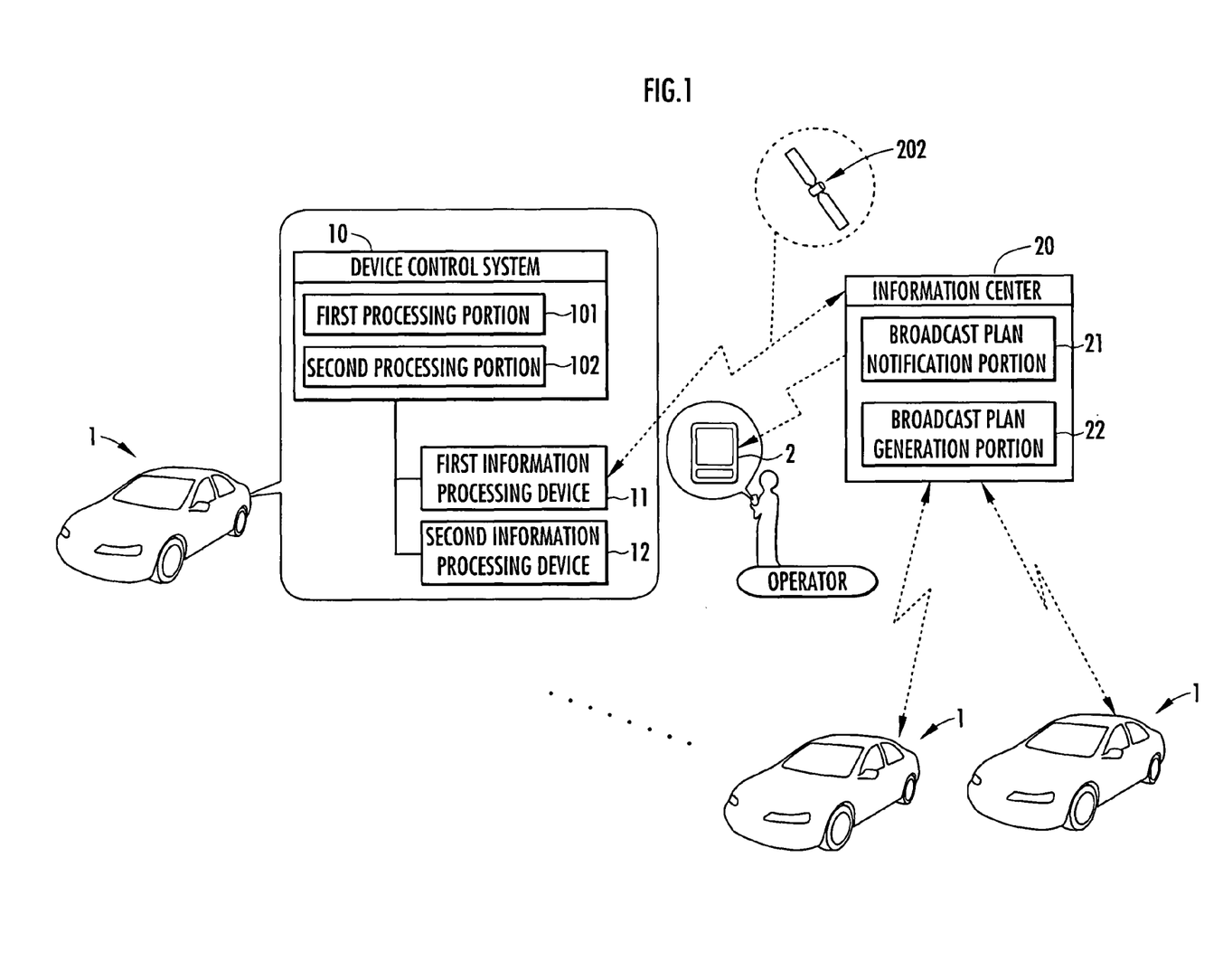
FIG. 1 illustrates configurations of a device control system and others according to an embodiment of the present invention.

A motor vehicle (mobile apparatus) 1 shown in FIG. 1 is provided with a first information processing device 11, a second information processing device 12, and a device control system 10 that controls an operation of first information processing device 11 and others. First information processing device 11 and second information processing device 12 are each switched between an ON state and an OFF state generally in response to switching of motor vehicle 1 between an ON state and an OFF state.

First information processing device 11 receives data broadcast at low speed or high speed from an information center 20 via a low-speed broadcast channel or a high-speed broadcast channel. First information processing device 11 may be, e.g., a navigation device, which has a function of searching for a route to a destination based on map information, a function of displaying the searched route on a display, and the like.

Second information processing device 12 may be, e.g., a hands-free communication device, a device controlling the behavior of motor vehicle 1 in accordance with outputs from a rudder angle sensor, a speed sensor, a yaw rate sensor and other sensors (not shown), or an air-conditioning control device.

Device control system 10 is composed of: an ECU or computer (having CPU, ROM, RAM, I/O and others) as hardware mounted on motor vehicle 1; and a "device control program" of the present invention as software stored in a memory and providing various functions to the computer. The device control program may be stored from the beginning in a memory (or recording medium) of the computer mounted in the motor vehicle, or all or part of the program may be distributed or transmitted from information center 20 or other server (not shown) via a network or satellite to the computer mounted in the motor vehicle, at an arbitrary timing such as upon a request from the computer, and stored in the memory. Further, all or part of the device control program of the present invention may be broadcast from information center 20 as "update data", and thereafter, it may be input and stored in the computer mounted in the motor vehicle.

Device control system 10 includes a first processing section 101 and a second processing section 102.

First processing section 101 causes first information processing device 11 to attain a state enabling a prescribed operation by an operator, on the condition that prescribed information broadcast from information center 20 is received by first information processing device 11. Further, first processing section 101 causes first information processing device 11 to recognize designated data received via a high-speed broadcast channel. First processing section 101 may cause first information processing device 11 to additionally recognize data other than the designated data received via a low-speed broadcast channel. Moreover, first processing section 101 causes first information processing device 11 to start reception of the designated data, on the condition that it is recognized that there was the prescribed operation by the operator in first information processing device 11. Furthermore, first processing section 101 determines whether reception of the designated data by first information processing device 11 has been completed, not completed yet, or interrupted, based on whether all the packets constituting the designated data have been received by first information processing device 11, and decoded, verified, and stored in the memory. Still further, first processing section 101 determines whether first information processing device 11 has been set to receive data through a high-speed broadcast channel.

Second processing section 102, when motor vehicle 1 is switched from the ON state to the OFF state, causes first information processing device 11 to maintain the ON state to receive the designated data through the high-speed broadcast channel, on the condition that it is recognized by first processing section 101 that first information processing device 11 is set to receive data through the high-speed broadcast channel. Further, when motor vehicle 1 is switched from the ON state to the OFF state, second processing section 102 restricts, e.g., execution of information processing by first information processing device 11, similarly on the condition that it is recognized by first processing section 101 that first information processing device 11 is set to receive data through the high-speed broadcast channel. For example, second processing section 102 restricts reception of data other than the designated data by first information processing device 11. Further, second processing section 102 restricts an execution instruction for information processing to first information processing device 11 by the operator. Furthermore, second processing section 102 restricts an execution request for information processing from second information processing device 12 to first information processing device 11.

Second processing section 102 outputs to the display a "restriction notification" indicating that the operator's execution instruction for information processing to first information processing device 11 is restricted. Further, second processing section 102 outputs to second information processing device 12 a "restriction notification" indicating that the execution request for information processing from second information processing device 12 to first information processing device 11 is restricted.

Further, second processing section 102 switches first information processing device 11 and the like from the ON state to the OFF state, on the conditions that first processing section 101 recognizes that reception of the designated data by first information processing device 11 has been completed and that the mobile apparatus is in the OFF state. Furthermore, second processing section 102 removes the restriction on execution of the information processing by first information processing device 11 and the like, similarly on the condition that first processing section 101 recognizes that reception of the designated data by first information processing device 11 has been completed. Still further, second processing section 102 outputs a "removal notification" indicating that the restriction on execution of the information processing by first information processing device 11 and the like has been removed.

After first processing section 101 recognizes that reception of the designated data by first information processing device 11 has been completed, on the condition that there is an update instruction operation by a user in first information processing device 11, second processing section 102 updates the function of first information processing device 11 or second information processing device 12 based on the designated data. Further, second processing section 102 causes first information processing device 11 to transmit to information center 20 an "update completion notification" indicating that updating of the function of first information processing device 11 or second information processing device 12 based on the designated data has been completed.

Information center 20 corresponds to a server (having CPU, ROM, RAM, I/O and others), which includes a broadcast plan notification portion 21 and a broadcast plan generation portion 22. Information center 20 broadcasts various information and data, including prescribed information for enabling a prescribed operation by an operator in first information processing device 11.

Broadcast plan notification portion 21 broadcasts a "broadcast plan" indicating the time zone, or time zone and area, in which first information processing device 11 is capable of receiving designated data through a high-speed broadcast channel, so that it can be output to an information terminal 2 accessible by the operator. Broadcast plan generation portion 22 generates the broadcast plan based on the update completion notification transmitted from first information processing device 11 to information center 20 by second processing section 102.

It is noted that first information processing device 11 may transmit/receive data to/from information center 20 in various manners. For example, first information processing device 11 may receive data from information center 20 not via a satellite 202 but via a network. Further, first information processing device 11 may transmit data to information center 20 (or a server constituting the same) not via a network but via satellite 202.

Hereinafter, the functions of device control system 10 and others having the above-described configurations will be described with reference to FIGS. 2-4.

Prior to execution of "first processing", a "broadcast plan" is distributed from broadcast plan notification portion 21 to information terminal 2, and is displayed on a display of information terminal 2. This allows the operator to recognize the broadcast plan, such as "high-speed broadcasting (burst broadcasting) is performed from XX hour to YY hour on ZZ (date)", through the display of information terminal 2.

Figure 2:
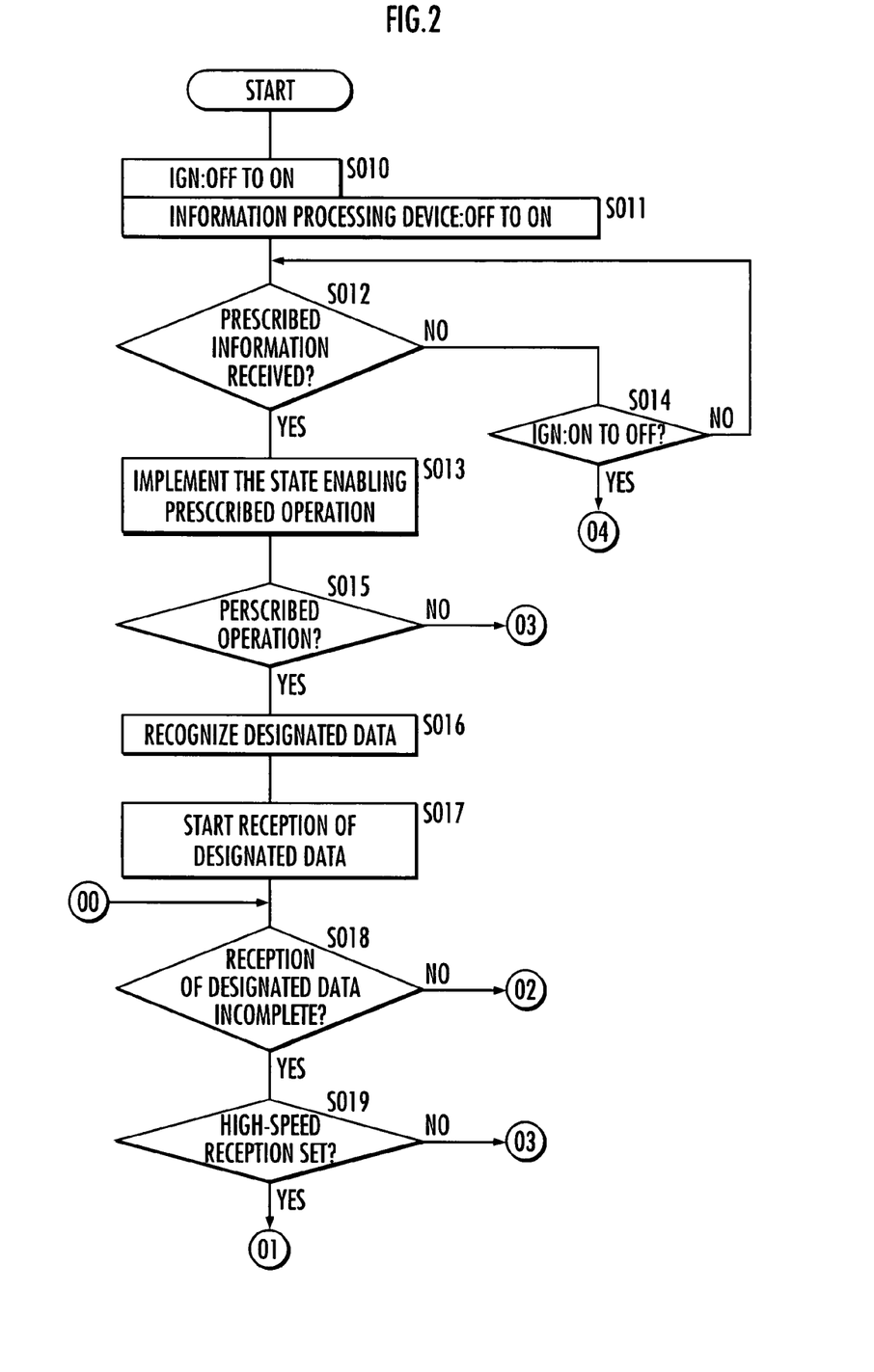
FIGS. 2-4 illustrate functions of the device control system and others according to the embodiment of the present invention.

When the operator switches the ignition switch of motor vehicle 1 from OFF to ON (FIG. 2: S010), device control system 10 as well as first information processing device 11 and second information processing device 12 are switched from the OFF state to the ON state where they are operable by power supplied from a battery mounted on the motor vehicle (not shown) (FIG. 2: S011). At this time, first information processing device 11 and second information processing device 12 are activated according to the existing software stored in the memory.

In response thereto, first processing section 101 starts the "first processing".

Initially, first processing section 101 recognizes whether "prescribed information" broadcast from information center 20 has been received by first information processing device 11 (FIG. 2: S012). The prescribed information may be, for example, the information received by first information processing device 11 together with or as a part of an update command, which will be described later. If first processing section 101 recognizes that the prescribed information has already been received by first information processing device 11 (FIG. 2: YES in S012), it causes first information processing device 11 to attain a state enabling a "prescribed operation" by the operator (FIG. 2: S013). Correspondingly, a message indicating that the prescribed operation is possible in first information processing device 11 and a touch button for the prescribed operation are displayed on the display (navigation display) of first information processing device 11, as shown in FIG. 4, for example. The prescribed operation may be an input of a password unique to motor vehicle 1, first information processing device 11 or the like. Further, the password may be the one corresponding to the prescribed information broadcast from information center 20. Furthermore, the prescribed operation may be an input of the password or a contact to a prescribed button within the time zone (or, the time zone and area) in accordance with the broadcast plan broadcast from information center 20.

Meanwhile, if first processing section 101 recognizes that the prescribed information has not been received by first information processing device 11 (FIG. 2: NO in S012) and when the operator has switched the ignition switch from ON to OFF (FIG. 2: YES in S014), second processing section 102 switches all of device control system 10, first information processing device 11 and second information processing device 12 from the ON state to the OFF state (FIG. 3: S029).

Further, first processing section 101 recognizes whether a prescribed operation has been performed by the operator in first information processing device 11 (FIG. 2: S015). If first processing section 101 recognizes that the prescribed operation has been performed (FIG. 2: YES in S015), it causes first information processing device 11 to recognize "designated data" received through a high-speed broadcast channel (FIG. 2: S016). For example, first information processing device 11 recognizes a data identifier for identification of the designated data. The data identifier has been received by first information processing device 11, e.g., together with or as a part of an update command, which will be described later, and has been stored in the memory. Further, first processing section 101 causes first information processing device 11 to start reception of the designated data through the high-speed broadcast channel (FIG. 2: S017). First information processing device 11 uses a data identifier assigned to the packet obtained through the high-speed broadcast channel, for example, to recognize whether the packet is the one constituting the designated data. Furthermore, first processing section 101 determines whether reception of the designated data by first information processing device 11 has been completed or not (FIG. 2: S018). The determination as to whether the reception of the designated data has been completed or not is made based on whether all the packets constituting the designated data have been received by first information processing device 11, and decoded, verified, and stored in the memory.

Meanwhile, if first processing section 101 recognizes that there is no prescribed operation by the operator for more than a predetermined period of time in first information processing device 11 (FIG. 2: NO in S015) and when the operator switches the ignition switch from ON to OFF (FIG. 3: YES in S028), second processing section 102 switches all of device control system 10, first information processing device 11 and second information processing device 12 from the ON state to the OFF state (FIG. 3: S029).

When determining that the reception of the designated data by first information processing device 11 is incomplete (FIG. 2: YES in S018), first processing section 101 determines whether first information processing device 11 has been set to receive data through a high-speed broadcast channel (FIG. 2: S019). The relevant determination is made, for example, based on whether first information processing device 11 has received an update command from information center 20 and whether it is within the period during which the update command is effective. Further, the relevant determination is made based on whether first information processing device 11 has received every one of content notifications of the software parts designated by the relevant update command and whether it is within the period during which the content notifications are effective. Still further, the relevant determination is made based on whether an update content list has been displayed on the display of first information processing device 11, based on the update command, and whether the operator has performed a prescribed, update permission operation.

If it is determined by first processing section 101 that first information processing device 11 has not been set to receive data through a high-speed broadcast channel (FIG. 2: NO in S019) and when the operator has switched the ignition switch from ON to OFF (FIG. 3: YES in S028), second processing section 102 switches all of device control system 10, first information processing device 11 and second information processing device 12 from the ON state to the OFF state (FIG. 3: S029).

Subsequently, second processing section 102 carries out "second processing".

When first processing section 101 determines that first information processing device 11 has been set to receive data through a high-speed broadcast channel (FIG. 2: YES in S019), second processing section 102 maintains first information processing device 11 in the ON state (FIG. 3: S020). This allows first information processing device 11 to receive the designated data through the high-speed broadcast channel, regardless of whether motor vehicle 1 is in the ON state or the OFF state.

Figure 3:
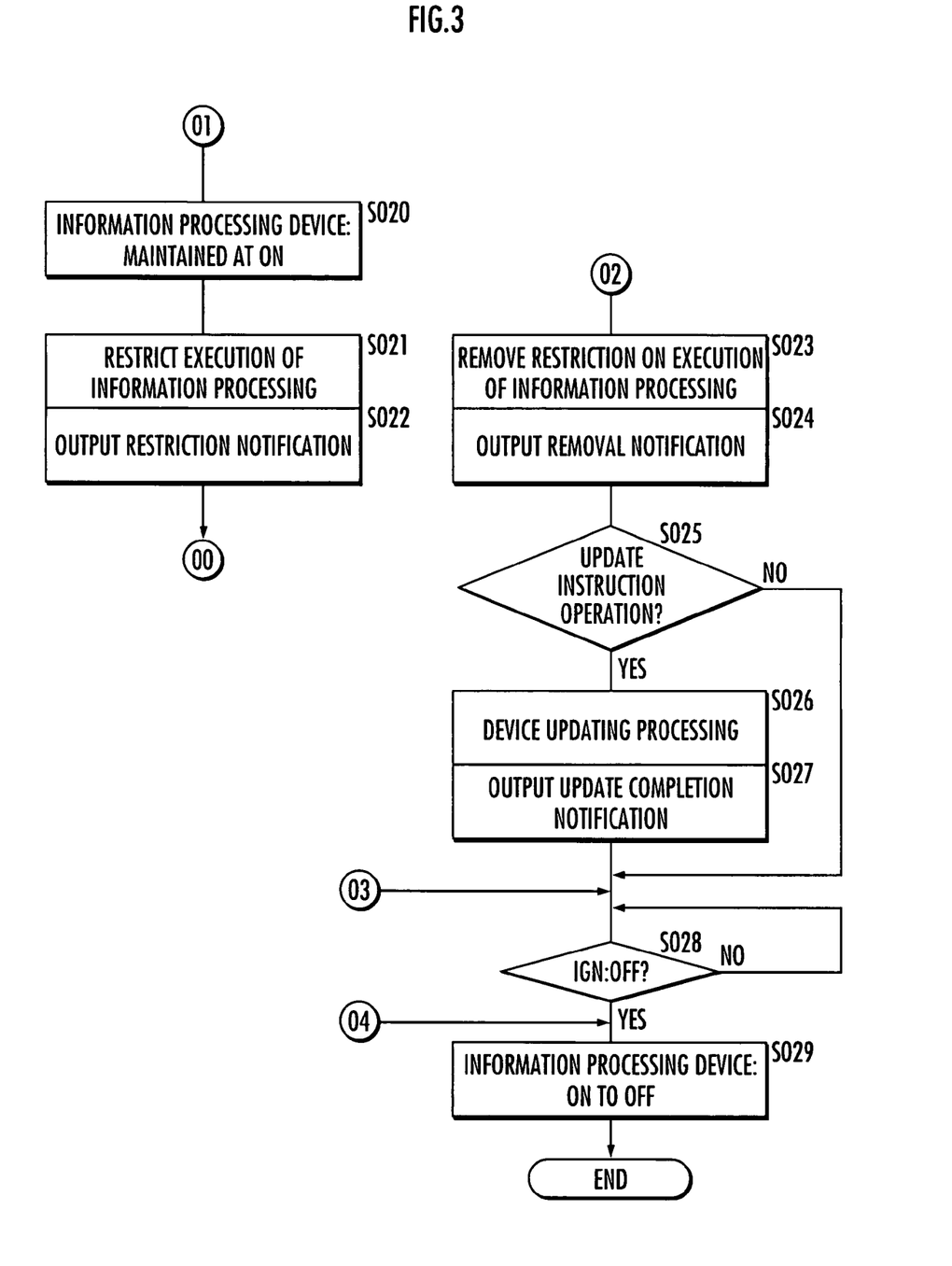

Further, second processing section 102 restricts execution of information processing by first information processing device 11 (FIG. 3: S021). This restricts, for example, reception of data other than the designated data by first information processing device 11. It also restricts an execution instruction for information processing to first information processing device 11 or second information processing device 12. Specifically, a touch-panel type button displayed on the display of first information processing device 11 is grayed out, for example, to restrict a contact to the button by the operator and, hence, the information processing corresponding thereto. Further, an execution request for information processing from second information processing device 12 to first information processing device 11 is restricted. For example, a recording request from second information processing device 12 to an audio device as first information processing device 11 is restricted, or a high-load request from second information processing device 12 to a navigation device as first information processing device 11 is restricted.

Further, second processing section 102 outputs a "restriction notification" indicating that execution of information processing by first information processing device 11 is restricted (FIG. 3: S022). Correspondingly, the restriction notification indicating that the execution instruction for information processing by the operator to first information processing device 11 is restricted is output to the display. For example, a touch-panel type button displayed on the display of first information processing device 11 is grayed out to restrict a contact to the button by the operator and the information processing corresponding thereto. Alternatively, a prescribed voice may be output through a speaker (not shown) as the restriction notification. Furthermore, the restriction notification indicating that information processing according to the execution request for information processing from second information processing device 12 to first information processing device 11 is restricted is output to second information processing device 12.

Meanwhile, when first processing section 101 recognizes that reception of the designated data by first information processing device 11 through the high-speed broadcast channel has been completed (FIG. 2: NO in S018), second processing section 102 removes the restriction on the information processing by first information processing device 11 (FIG. 3: S023). Further, second processing section 102 outputs a "removal notification" to the effect that the restriction on the information processing is removed (FIG. 3: S024). Accordingly, the removal notification indicating that the restriction on the execution instruction for information processing by the operator to first information processing device 11 or second information processing device 12 has been removed is output to the display. For example, the button on the display of first information processing device 11 that has been grayed out is changed to an active state. Alternatively, a prescribed voice as the removal notification may be output from the speaker. Furthermore, the removal notification indicating that the restriction on the information processing according to the execution request for information processing from second information processing device 12 to first information processing device 11 has been removed is output to second information processing device 12.

Figure 4:
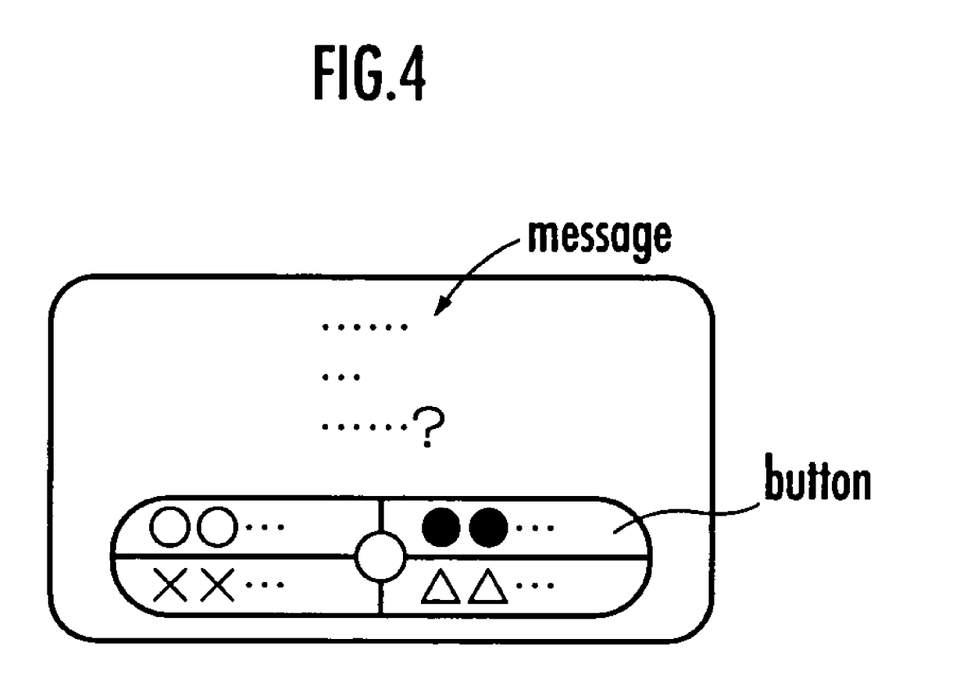

Second processing section 102 displays a message for confirming whether to update the function of first information processing device 11 or second information processing device 12 based on the designated data, and a touch button for operation of update instruction, on the display (see FIG. 4).

Second processing section 102 recognizes whether there has been an "update instruction operation" by the user in first information processing device 11 (FIG. 3: S025).

If second processing section 102 recognizes that there has been the update instruction operation (FIG. 3: YES in S025), it updates the function of first information processing device 11 or second information processing device 12 based on the designated data (FIG. 3: S026). The function of first information processing device 11 or second information processing device 12 is updated as the existing software stored in the memory of first information processing device 11 or second information processing device 12 is partially or entirely rewritten based on the designated data. The designated data may be generated through decoding of the packets received by first information processing device 11. Accordingly, when motor vehicle 1 is switched from the OFF state to the ON state afterwards (when the ignition switch is switched from OFF to ON), first information processing device 11 or second information processing device 12 is activated according to the updated or upgraded software (see FIG. 2: S011).

Further, second processing section 102 causes first information processing device 11 to output an "update completion notification" indicating that updating of the function of first information processing device 11 or second information processing device 12 has been completed (FIG. 3: S027). Correspondingly, the update completion notification is displayed on the display, for example. Further, the update completion notification is transmitted to information center 20.

Thereafter, if motor vehicle 1 is in the OFF state (FIG. 3: YES in S028), second processing section 102 switches first information processing device 11 and second information processing device 12 from the ON state to the OFF state (FIG. 3: S029).

Meanwhile, when second processing section 102 recognizes that there is no update instruction operation of the operator in first information processing device 11 for more than a predetermined period of time (or there has been an operation to suspend updating) (FIG. 3: NO in S025) and when the operator has switched the ignition switch from ON to OFF (FIG. 3: YES in S028), then second processing section 102 switches all of device control system 10, first information processing device 11 and second information processing device 12 from the ON state to the OFF state (FIG. 3: S029).

According to device control system 10 exerting the above-described functions, first processing section 101 causes first information processing device 11 to start reception of designated data through a high-speed broadcast channel, on the condition that there is a prescribed operation by an operator in first information processing device 11 (see FIG. 2: S015, S017). Accordingly, the reception of the designated data is started only when there is a prescribed operation in first information processing device 11, which may be an input to the information processing device of special information (key) that only the operator knows. This prevents the designated data from being received by first information processing device 11 in response to an operation of first information processing device 11 by a user of motor vehicle 1 who does not know the prescribed operation, and thus, prevents improper restriction of information processing by first information processing device 11.

Further, first processing section 101 causes first information processing device 11 to recognize the designated data (specifically, a data identifier for identification of the designated data) and to receive the recognized designated data through the high-speed broadcast channel (see FIG. 2: S016, S017). This prevents data other than the designated data from being received by first information processing device 11 through the high-speed broadcast channel.

Furthermore, first processing section 101 causes first information processing device 11 to attain a state enabling a prescribed operation by the operator, on the condition that prescribed information broadcast from information center 20 has been received by first information processing device 11 (see FIG. 2: S013). This prevents the designated data from being received by first information processing device 11 at an unexpected timing, and thus, prevents improper restriction on the information processing by first information processing device 11.

Moreover, second processing section 102 restricts information processing by first information processing device 11 when reception of the packets constituting the designated data by first information processing device 11 is incomplete and when first information processing device 11 has been set to receive data through a high-speed broadcast channel (see FIG. 2: YES in S018, YES in S019; and FIG. 3: S021). In this manner, the information processing resources of first information processing device 11 are primarily allocated to reception of the designated data through the high-speed broadcast channel. Further, it is restricted that the information processing resources are allocated to information processing other than the reception of the designated data, such as information processing instructed by the operator or information processing requested from second information processing device 12. Accordingly, it is possible to surely prevent the undesirable situation where information processing other than the reception of the designated data causes shortage of the information processing resources and thus impairs the reception of the designated data and further the execution of the relevant information processing. As described above, the operation of first information processing device 11 mounted on motor vehicle 1 can be controlled appropriately from the standpoint of effective use of the information processing resources of first information processing device 11.

When the execution instruction for information processing by the operator to first information processing device 11 is restricted, the "restriction notification" indicating that the execution instruction for information processing is restricted is output to the display (see FIG. 3: S021, S022). This surely prevents the undesirable situation where the instruction for information processing that is actually restricted is permitted to the operator, thereby causing misunderstanding or confusion of the operator.

Similarly, when the execution request for information processing from second information processing device 12 to first information processing device 11 is restricted, the "restriction notification" indicating that the execution request for information processing is restricted is output to second information processing device 12 (see FIG. 3: S021, S022). This surely prevents the undesirable situation where the execution request for information processing that is actually restricted is permitted to second information processing device 12, thereby impairing other information processing by second information processing device 12. It also prevents the situation, e.g., where despite a request from second information processing device 12 for execution of information processing to first information processing device 11, the requested information processing is not executed for a long time, thus leading to erroneous detection of occurrence of an error.

The restriction on execution of the information processing by first information processing device 11 is removed on the condition that it is determined that the reception of the designated data by first information processing device 11 has been completed (see FIG. 2: NO in S018; FIG. 3: S023). In response, the information processing resources of first information processing device 11 that have been allocated to the reception of the designated data through the high-speed broadcast channel are assigned to other information processing after the completion of the reception of the designated data. This ensures effective use of the information processing resources of first information processing device 11.

The removal notification indicating that the restriction on execution of the information processing by first information processing device 11 has been removed is output (see FIG. 3: S024). This allows the user and second information processing device 12 to recognize that the reception of the designated data by first information processing device 11 through the high-speed broadcast channel has been completed and that the information processing restricted theretofore is now possible.

Even when motor vehicle 1 is switched from the ON state to the OFF state, first information processing device 11 is maintained in the ON state exceptionally on the condition that first information processing device 11 has been set to receive data through a high-speed broadcast channel (see FIG. 2: YES in S019; FIG. 3: S020). Thus, it is possible to maintain the ON state of first information processing device 11, while motor vehicle 1 is in the OFF state, to cause first information processing device 11 to receive (or continue to receive) the designated data through the high-speed broadcast channel. Further, since the designated data is broadcast at high speed from information center 20, the time required for first information processing device 11 to complete reception of the designated data is reduced. In this manner, the operation of first information processing device 11 mounted on motor vehicle 1 can be controlled to efficiently receive data, while ensuring economy of the resources (gasoline, battery power and others) of motor vehicle 1.

First information processing device 11 and the like are switched from the ON state to the OFF state in response to completion of reception of the designated data by first information processing device 11 (see FIG. 2: NO in S018; FIG. 3: S029). This saves the resources (power) for keeping the ON state of first information processing device 11.

Further, the update completion notification allows the operator to recognize that the function of first information processing device 11 or second information processing device 12 has been updated (see FIG. 3: S027). It also allows information center 20 or a concerned party to recognize the progress in updating of the function of first information processing device 11 or second information processing device 12 mounted on each of a great number of motor vehicles 1, to thereby allow creation of a broadcast plan of the designated data by broadcast plan generation portion 22 of information center 20.

It is noted that first processing section 101 may cause first information processing device 11 to recognize data other than the designated data (specifically, a data identifier for identification of the relevant data) and receive the recognized data through a low-speed broadcast channel (see FIG. 2: S016). This avoids total prohibition of reception of important data other than the designated data by first information processing device 11.

Furthermore, when the reception of the designated data by first information processing device 11 through the high-speed broadcast channel is interrupted, it may be possible to control first information processing device 11 to attain the ON state or the OFF state depending on the amount of packets yet to be received among those constituting the designated data.

More specifically, in such a case, second processing section 102 switches first information processing device 11 from the ON state to the OFF state on the conditions that motor vehicle 1 is in the OFF state and that the amount of the yet-to-be-received (or, unreceived) portion of the designate data is equal to or greater than a threshold value. This prevents first information processing device 11 from being maintained in the ON state for a long period of time until completion of reception of the unreceived portion of the designated data through the low-speed broadcast channel.

Meanwhile, on the condition that the amount of unreceived portion of the designated data is less than the threshold value, second processing section 102 maintains first information processing device 11 in the ON state to cause it to receive the unreceived portion of the designated data through the low-speed broadcast channel. In this manner, it is possible to cause first information processing device 11 to complete reception of the unreceived portion of the designated data through the low-speed broadcast channel, while preventing prolongation of the time during which first information processing device 11 is maintained in the ON state.

After motor vehicle 1 is switched from the ON state to the OFF state, if the reception of the designated data by first information processing device 11 through the high-speed broadcast channel is not finished within a prescribed period of time, the setting of first information processing device 11 to receive data through a high-speed broadcast channel may be cancelled by second processing section 102, and first information processing device 11 may be switched from the ON state to the OFF state. Further, when first information processing device 11 is switched from the OFF state to the ON state afterwards in response to switching of motor vehicle 1 from the OFF state to the ON state, the remaining packets constituting the designated data may be received by first information processing device 11 through a low-speed broadcast channel.

What is claimed is:

1. A device control system for controlling an operation of an information processing device mounted on a mobile apparatus and having a function to receive data broadcast at low speed or high speed from an information center through a low-speed broadcast channel or a high-speed broadcast channel, comprising:
 a first processing section to recognize whether a first information processing device is set to receive data through the high-speed broadcast channel, to cause the first information processing device to recognize a designated data and receive the recognized designated data through the high-speed broadcast channel, and to cause the first information processing device to recognize data other than the designated data and receive the recognized data through the low-speed broadcast channel; and
 a second processing section to restrict execution of information processing by the first information processing device on the condition that it is recognized by the first processing section that the first information processing device is set to receive data through the high-speed broadcast channel, and to restrict reception of data other than designated data by the first information processing device through the low-speed broadcast channel or the high-speed broadcast channel based on recognition as to whether the data is the designated data or not according to a data identifier assigned to the data.

2. The device control system according to claim 1, wherein the second processing section restricts an execution instruction for information processing to the first information processing device by an operator.

3. The device control system according to claim 2, wherein the second processing section outputs a restriction notification indicating that the execution instruction for the information processing to the first information processing device by the operator is restricted.

4. The device control system according to claim 1, wherein the second processing section restricts an execution request for information processing to the first information processing device from a second information processing device mounted on the mobile apparatus.

5. The device control system according to claim 4, wherein the second processing section outputs to the second information processing device a restriction notification indicating that information processing involving the execution request for the information processing to the first information processing device from the second information processing device is restricted.

6. The device control system according to claim 1, wherein the second processing section removes the restriction on execution of the information processing by the first information processing device, on the condition that it is recognized by the first processing section that reception of the designated data by the first information processing device has been completed.

7. The device control system according to claim 6, wherein the second processing section outputs a removal notification indicating that the restriction on execution of the information processing by the first information processing device has been removed.

8. The device control system according to claim 1, wherein the first processing section causes the first information processing device to start reception of the designated data through the high-speed broadcast channel, on the condition of recognition of a prescribed operation by an operator in the first information processing device.

9. The device control system according to claim 8, wherein the first processing section causes the first information processing device to start reception of the designated data through the high-speed broadcast channel, on the condition of recognition of the prescribed operation in response to information broadcast from the information center and received by the first information processing device.

10. The device control system according to claim 9, wherein the first processing section causes the first information processing device to attain a state enabling the prescribed operation by the operator, on the condition that prescribed information broadcast from the information center has been received by the first information processing device.

11. The device control system according to claim 8, wherein the first processing section causes the first information processing device to attain a state enabling the prescribed operation by the operator, on the condition that prescribed information broadcast from the information center has been received by the first information processing device.

12. A device control program for causing a computer mounted in a mobile apparatus to function as a system controlling an operation of an information processing device mounted on the mobile apparatus and having a function to receive data broadcast at low speed or high speed from an information center through a low-speed broadcast channel or a high-speed broadcast channel, the device control program causing the computer to function as the system comprising:
 a first processing section to recognize whether a first information processing device is set to receive data through the high-speed broadcast channel, to cause the first information processing device to recognize a designated data and receive the recognized designated data through the high-speed broadcast channel, and to cause the first information processing device to recognize data other than the designated data and receive the recognized data through the low-speed broadcast channel; and
 a second processing section to restrict execution of information processing by the first information processing device on the condition that it is recognized by the first processing section that the first information processing device is set to receive data through the high-speed broadcast channel, and to restrict reception of data other than designated data by the first information processing device through the low-speed broadcast channel or the high-speed broadcast channel based on recognition as to whether the data is the designated data or not according to a data identifier assigned to the data.

13. An establishment system for establishing a computer mounted in a mobile apparatus as a device control system by distributing or broadcasting a device control program and causing the computer to store the device control program, the establishment system establishing the device control system controlling an operation of an information processing device mounted on the mobile apparatus and having a function to receive data broadcast at low speed or high speed from an information center through a low-speed broadcast channel or a high-speed broadcast channel, and including:

a first processing section to recognize whether a first information processing device is set to receive data through the high-speed broadcast channel, to cause the first information processing device to recognize a designated data and receive the recognized designated data through the high-speed broadcast channel, and to cause the first information processing device to recognize data other than the designated data and receive the recognized data through the low-speed broadcast channel; and     a second processing section to restrict execution of information processing by the first information processing device on the condition that it is recognized by the first processing section that the first information processing device is set to receive data through the high-speed broadcast channel, and to restrict reception of data other than designated data by the first information processing device through the low-speed broadcast channel or the high-speed broadcast channel based on recognition as to whether the data is the designated data or not according to a data identifier assigned to the data.

* * * * *